US011038170B2

(12) United States Patent
Asano et al.

(10) Patent No.: US 11,038,170 B2
(45) Date of Patent: Jun. 15, 2021

(54) ACTIVE MATERIAL INCLUDING METAL COMPOSITE FLUORIDE FOR FLUORIDE ION SECONDARY BATTERY, AND FLUORIDE ION SECONDARY BATTERY USING THE SAME

(71) Applicant: Panasonic Intellectual Property Management Co., Ltd., Osaka (JP)

(72) Inventors: Kazuko Asano, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 16/405,326

(22) Filed: May 7, 2019

(65) Prior Publication Data
US 2019/0363360 A1 Nov. 28, 2019

(30) Foreign Application Priority Data
May 22, 2018 (JP) .............................. JP2018-097516

(51) Int. Cl.
*H01M 4/58* (2010.01)
*H01M 10/05* (2010.01)
*H01M 4/02* (2006.01)

(52) U.S. Cl.
CPC ........... *H01M 4/582* (2013.01); *H01M 10/05* (2013.01); *H01M 2004/028* (2013.01)

(58) Field of Classification Search
None
See application file for complete search history.

(56) References Cited

U.S. PATENT DOCUMENTS

2008/0102373 A1   5/2008   Potanin

FOREIGN PATENT DOCUMENTS

| DE | 102014112928 A1 | 3/2016 |
| JP | 2001-176510 A | 6/2001 |
| JP | 2008-537312 | 9/2008 |
| JP | 2013-073791 A | 4/2013 |
| JP | 2013-145758 | 7/2013 |
| WO | 2007/146453 | 12/2007 |
| WO | 2018/198410 A1 | 11/2018 |

OTHER PUBLICATIONS

Rousseau et al. "A novel intercalation cathode material for sodium-based batteries". Electrochemistry Communications (2015), 52, pp. 9-12.*
The Extended European Search Report dated Jul. 22, 2019 for the related European Patent Application No. 19173243.7.
Renaudin J et al: "Complex copper(II) fluorides. II. Crystal structure, magnetic properties and Mossbauer study of the partly disordered ferrimagnet barium copper iron fluoride (BaCuFeF7)", Revue De Chimie Minerale, Gauthier Villars, Paris, FR, vol. 22, No. 1, Jan. 1985 (Jan. 1, 1985), pp. 74-84, XP009514345.
Communication pursuant to Article 94(3) EPC dated Jul. 20, 2020 for the related European Patent Application No. 19173243.7.

* cited by examiner

*Primary Examiner* — Laura Weiner
(74) *Attorney, Agent, or Firm* — McDermott Will and Emery LLP

(57) ABSTRACT

An active material for a fluoride ion secondary battery includes a metal composite fluoride. The metal composite fluoride contains at least one metal selected from the group consisting of an alkali metal, an alkaline earth metal, scandium, yttrium, and a lanthanoid; a first transition metal; a second transition metal different from the first transition metal; and fluorine.

5 Claims, 1 Drawing Sheet

ACTIVE MATERIAL INCLUDING METAL COMPOSITE FLUORIDE FOR FLUORIDE ION SECONDARY BATTERY, AND FLUORIDE ION SECONDARY BATTERY USING THE SAME

BACKGROUND

1. Technical Field

The present disclosure relates to an active material for a fluoride ion secondary battery and a fluoride ion secondary battery using the same.

2. Description of the Related Art

In recent years, a fluoride ion secondary battery using fluoride ions has been proposed.

For example, Japanese Unexamined Patent Application Publication No. 2013-145758 has disclosed a fluoride ion electrochemical cell. This patent literature has disclosed as a positive electrode material, $CF_x$, $AgF_x$, $CuF_x$, $NiF_x$, $CoF_x$, $PbF_x$, and $CeF_x$, and as a negative electrode material, $LaF_x$, $CaF_x$, $AlF_x$, $EuF_x$, $LiC_6$, $Li_xSi$, $SnF_x$, and $MnF_x$.

SUMMARY

In one general aspect, the techniques disclosed here feature an active material for a fluoride ion secondary battery, the active material comprising a metal composite fluoride. The metal composite fluoride contains: at least one metal selected from the group consisting of an alkali metal, an alkaline earth metal, scandium, yttrium, and a lanthanoid; a first transition metal; a second transition metal different from the first transition metal; and fluorine.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
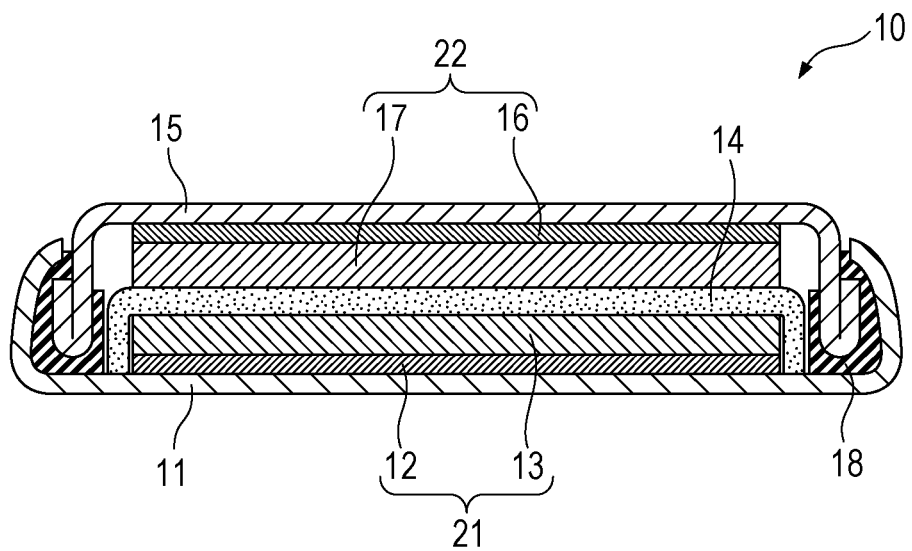
FIG. 1 is a cross-sectional view schematically showing an example of a fluoride ion secondary battery according to an embodiment.

The following descriptions each show a comprehensive or a concrete example. The following numerical value, composition, shape, film thickness, electrical characteristics, structure of a secondary battery, electrode material, and the like are shown by way of example and are not intended to limit the present disclosure. A constituent element not described in an independent claim that shows the topmost concept is an arbitrary constituent element.

In the following descriptions, unless otherwise specifically noted, a material represented by a substance name is not limited to a material having a stoichiometric composition and may also includes a material having a non-stoichiometric composition.

In the following descriptions, a numerical range represented by the phrase "x to y" is to be understood that the values "x" and "y" are included in the above range.

[1. Active Material]

[1-1. Composition of Active Material]

An active material according to this embodiment includes a metal composite fluoride. This metal composite fluoride contains at least one metal selected from the group consisting of an alkali metal, an alkaline earth metal, scandium, yttrium, and a lanthanoid, a first transition metal, a second transition metal different from the first transition metal, and fluorine.

For example, the first transition metal and the second transition metal are two different metals each selected from the group consisting of 3d transition metals.

This active material may be either a positive electrode active material or a negative electrode active material.

When being used for a fluoride ion secondary battery, this active material is able to exhibit a large capacity as compared to that of an existing material (such as the material disclosed in Japanese Unexamined Patent Application Publication No. 2013-145758).

In the metal composite fluoride described above, the first transition metal may be one selected from the group consisting of Mn, Fe, Co, Ni, and Cu, and/or the second transition metal may be one selected from the group consisting of Mn, Fe, Co, Ni, and Cu. Mn, Fe, Co, Ni, and Cu each can increase an electrode potential of the metal composite fluoride. Hence, for example, the metal composite fluoride may be used to function as the positive electrode active material.

In the metal composite fluoride described above, the oxidation number of the first transition metal may be +2, and the oxidation number of the second transition metal may be +3. For example, the first transition metal may be Cu, and the second transition metal may be Fe. However, as described above, the oxidation number of the first transition metal and/or the oxidation number of the second transition metal may be changed by a charge/discharge reaction.

In the metal composite fluoride described above, the at least one metal may be at least one selected from the group consisting of Na, Ca, Rb, Cs, Mg, Ca, Sr, Ba, Sc, Y, La, Ce, and Sm. For example, when the above at least one metal is arranged at a desired site in a crystalline structure of the metal composite fluoride, a metal having a desired ion radius may be selected.

In the metal composite fluoride described above, the at least one metal may be at least one selected from the group consisting of Mg, Ca, Sr, and Ba or, for example, may also be Ba.

The metal composite fluoride described above may be represented by a composition formula of $A_xM1_{y1}M2_{y2}F_z$, where A represents Mg, Ca, Sr, or Ba; M1 and M2 are two different types each selected from the group consisting of Mn, Fe, Co, Ni, and Cu; and $0.7 \le x \le 1$, $1 < y1+y2 \le 2$, and $6 < z < 8$.

In the composition formula described above, since $0.7 \le x$ is satisfied, the structure of the metal composite fluoride can be stabilized. Since $x \le 1$ and $1 < y1+y2$ are satisfied, the ratio of the transition metals can be increased, and the capacity can be increased. Since $y1+y2 \le 2$ is satisfied, a reaction of a transition metal having a relatively large valence (such as +3) can be used. When the change in large valence can be used in an electrode reaction, the electrode potential can be increased. Since $6 < z < 8$ is satisfied, while the decrease in density of the metal composite fluoride is suppressed, the ratio of fluorine involved in the electrode reaction can be increased, and hence, the capacity can be increased. z may further satisfy an equation of $6.5 \leq z \leq 7.0$.

The composition of the active material (or the metal composite fluoride) can be determined, for example, by an inductively-coupled plasma (ICP) emission spectrochemical analytical method and an ion chromatography. The crystalline structure of the metal composite fluoride thus obtained can be determined by a powder X-ray diffraction (XRD) analysis.

The metal composite fluoride may be, for example, either a solid solution or an amorphous substance. The metal composite fluoride may be a part of an active material having a polycrystalline structure.

The metal composite fluoride has, for example, a layered structure. The crystalline structure of the metal composite fluoride may belong, for example, to the space group C12/c1 or P4/nmm. In addition, the "crystalline structure" does not limit that the metal composite fluoride is a crystal but includes a microscopic crystalline structure contained in an amorphous substance (such as a cryptocrystal). The "microscopic crystalline structure" represents a short distance-order detectable, for example, by an XRD analysis or a transmission electron microscope.

The active material may include the metal composite fluoride described above as a primary component. In this case, the "include as a primary component" indicates that the active material includes 50 percent by mass or more of the above metal composite fluoride.

Although the shape of the active material is not particularly limited, for example, the shape thereof is particles. When the shape of the active material is particles, the average particle diameter thereof is not particularly limited and, for example, may be 0.5 to 50 μm. In this case, the average particle diameter may be defined as the median diameter of a volume-basis particle size distribution obtained by a laser diffraction scattering method.

[1-2. Assumed Mechanism]

Heretofore, as the active material for a fluoride ion secondary battery, metal fluorides each containing a single metal have been reported in many cases. Those metal fluorides each exhibit a conversion reaction based on defluorination and fluorination performed in association with charge/discharge of the battery. In particular, during the discharge, the positive electrode active material is defluorinated from a metal fluoride to a metal, and during the charge, the positive electrode active material is fluorinated from a metal to a metal fluoride. During the discharge, the negative electrode active material is fluorinated from a metal to a metal fluoride, and during the charge, the negative electrode active material is defluorinated from a metal fluoride to a metal.

However, an active material using a fluorination reaction and a defluorination reaction has a problem in that a sufficient capacity cannot be obtained. When the reaction rates of fluorination and defluorination of this active material are appropriately controlled, stable charge/discharge can be obtained. However, since the fluoride has a low stability, the equilibrium between a fluorination reaction and a defluorination reaction is liable to be biased in an unintentional direction. For example, when a metal in the active material is excessively dissolved in an electrolyte liquid, the metal thus dissolved may cause a side reaction with the electrolyte liquid or may be eluted at an unintentional position. Those irreversible changes decrease the capacity.

On the other hand, the active material according to this embodiment can exhibit a large capacity. Although the reason for this has not been clearly understood, as one possible reason, the present inventors believed that fluoride ions can be occluded in and released from the active material according to this embodiment. The present inventors assumed that the relationship between the structure of the active material according to this embodiment and the occlusion and release of fluoride ions is as described below.

First, the metal composite fluoride contains a plurality of metals. For example, compared to a metal fluoride $MF_x$, the metal composite fluoride is able to have many fluoride ions per unit cell. Hence, the crystalline structure of the metal composite fluoride is not likely to collapse even when fluoride ions are released. In addition, compared to the metal fluoride $MF_x$ in which metal ions and fluoride ions are alternately arranged, the metal composite fluoride has many fluoride ion sites adjacent to each other. Hence, the fluoride ions are likely to move through a series of those sites functioning as a conduction path.

In the second place, the metal composite fluoride contains at least one metal selected from the group consisting of an alkali metal, an alkaline earth metal, scandium, yttrium, and a lanthanoid. Since the valence of each of those metals is not changed in a region of an electrode operation voltage, a stable electron state can be maintained. Accordingly, when fluoride ions are occluded in and released from the metal composite fluoride, those metals each can stably support the crystalline structure of the metal composite fluoride and can suppress the metal composite fluoride from collapsing. In addition, when a metal having an optimum ion radius is selected from those metals, the influence to the crystalline structure caused by the change in ion radius of the transition metal in association with the occlusion and release of the fluoride ions can be reduced.

In the third place, the metal composite fluoride contains two types of transition metals. Since having different ion radii, the two types of transition metals can form local structures different from each other. Accordingly, the crystalline structure of the metal composite fluoride can be stabilized as a whole. In addition, when the valences of the two types of transition metals are each changed in association with the occlusion and release of the fluoride ions, redox potentials in accordance with the changes of the respective valences can be used. Accordingly, operation can be performed in a desired voltage range.

The mechanism described above is merely assumed by the present inventors and is not intended to limit the present disclosure.

In addition, in a lithium ion battery, an insertion type active material has been widely known, and this active material can perform occlusion and release of lithium ions without significantly changing a host structure. However, in the fluoride ion secondary battery, reports on the insertion type active material have been hardly disclosed. The reasons for this are believed that the number of reports on the fluoride ion secondary battery has been small from the beginning, and that since the ion radius of the fluoride ion is large as compared to that of the lithium ion, the occlusion and release of the fluoride ions cannot be easily performed while the host structure is maintained.

[1-3. Method for Manufacturing Active Material]

One example of a method for manufacturing an active material according to this embodiment will be described.

First, as raw materials, a fluoride containing at least one metal selected from the group consisting of an alkali metal, an alkaline earth metal, scandium, yttrium, and a lanthanoid, a fluoride containing a first transition metal, and a fluoride containing a second transition metal are prepared.

The fluoride containing an alkali metal is, for example, an alkali metal fluoride AF, where A represents Na, K, Rb, or Cs. The fluoride containing an alkaline earth metal is, for example, an alkaline earth metal fluoride $AF_2$, where A represents Mg, Ca, Sr, or Ba. The fluoride containing scandium is, for example, scandium fluoride (III). The fluoride containing yttrium is, for example, yttrium fluoride (III). The fluoride containing a lanthanoid is, for example, a lanthanoid fluoride $AF_3$, where A represents La, Ce, or Sm.

The fluoride containing a first transition metal is, for example, a first transition metal fluoride $M1F_n$, where M1 represents a first transition metal, and n indicates the valence of the first transition metal. Examples of the first transition metal fluoride include $MnF_2$, $FeF_3$, $FeF_2$, $CoF_3$, $CoF_2$, $NiF_2$, and $CuF_2$.

The fluoride containing a second transition metal is, for example, a second transition metal fluoride $M2F_m$, where M2 represents a second transition metal, and m indicates the valence of the second transition metal. Examples of the second transition metal fluoride include $MnF_2$, $FeF_3$, $FeF_2$, $CoF_3$, $CoF_2$, $NiF_2$, and $CuF_2$.

In addition, the raw materials for the active material are not limited to those described above. For example, some of the metal sources described above each may be a single metal. For example, a raw material containing a plurality of metals may also be used.

The shape of each raw material is, for example, a powder.

Next, the raw materials thus prepared are weighed. The amount of each raw material is appropriately adjusted in accordance with the composition of a target metal composite fluoride.

Next, the raw materials thus weighed are mixed together.

For example, the raw materials are mixed together for a long time, so that a metal composite fluoride is obtained by a mechanochemical reaction. In this case, examples of a mixing device include a ball mill, a rod mill, a bead mill, a jet mill, and a mix rotor. As a mixing method, for example, either a dry method or a wet method may be used. In the case of the wet method, the raw materials may be mixed with an organic solvent. As the organic solvent, for example, ethanol or acetone may be used. A mixing time is, for example, 10 to 48 hours.

Alternatively, after the raw materials are mixed together for a short time, a metal composite fluoride may be obtained by firing. For the mixing, the mixing device described above may also be used, or a mortar may be used. As a mixing method, for example, either a dry method or a wet method may be performed. For example, when a mortar is used, a mixing time is 15 minutes to one hour, and when a ball mill is used, the mixing time is 12 to 24 hours. A mixture thus obtained is fired in an inert atmosphere. Examples of an inert gas include nitrogen and argon. Although being changed depending on the types of raw materials and/or the target composition, a temperature condition is set, for example, to 300° C. to 800° C. A firing time is set, for example, to 3 to 48 hours.

By the method described above, the active material according to this embodiment can be obtained.

[2. Fluoride Ion Secondary Battery]

[2-1. Configuration]

The active material according to this embodiment may be used for a fluoride ion secondary battery. That is, the fluoride ion secondary battery includes a positive electrode, a negative electrode, and an electrolyte having a fluoride ion conductivity.

FIG. 1 is a cross-sectional view schematically showing an example of a fluoride ion secondary battery 10.

The fluoride ion secondary battery 10 includes a positive electrode 21, a negative electrode 22, a separator 14, a case 11, a sealing plate 15, and a gasket 18. The separator 14 is disposed between the positive electrode 21 and the negative electrode 22. In the positive electrode 21, the negative electrode 22, and the separator 14, an electrolyte is impregnated, and those components described above are received in the case 11. The case 11 is sealed by the gasket 18 and the sealing plate 15.

The structure of the fluoride ion secondary battery 10 may be, for example, a cylindrical type, a square type, a button type, a coin type, or a flat type.

[2-2. Positive Electrode]

The positive electrode 21 includes a positive electrode collector 12 and a positive electrode active material layer 13 disposed on the positive electrode collector 12.

The positive electrode active material layer 13 may contain the active material described in the above [1-1. Composition of Active Material]. In addition, the amount of fluorine in the active material can be changed in association with charge/discharge. Hence, for example, in a certain charged state of the fluoride ion secondary battery 10, the active material may have the composition described in the above [1-1. Composition of Active Material].

The "certain charged state" may be a fully charged state, for example. Here, the "fully charged state" indicates the state in which the voltage of the fluoride ion secondary battery reaches a charge end voltage, and the battery is fully charged. In the fully charged state, fluoride ions in an amount corresponding to the reversible capacity are all incorporated in the positive electrode active material. For example, when the charge potential is 0.6 V or more with reference to $Ag/Ag^+$ basis, the positive electrode active material according to this embodiment can be regarded to be in a fully charged state.

The positive electrode active material may be not the above active material and may be, for example, a metal, an alloy, or a fluoride, each of which contains at least one selected from the group consisting of Cu, Ag, Hg, Mo, Au, Co, V, Bi, Sb, Ni, TI, Pb, Cd, Fe, V, Nb, Zn, Ga, and Cr. Alternatively, the positive electrode active material may be a carbon fluoride.

The positive electrode active material layer 13 may contain either only one active material or at least two types of active materials.

The positive electrode active material layer 13 may further include, if needed, an electrically conductive agent, a binding agent, and/or an ion conductor.

Examples of the electrically conductive agent include a carbon material, a metal, an inorganic compound, and an electrically conductive high molecular weight material. Examples of the carbon material include graphite, carbon black, carbon nanotubes, carbon fibers, a graphene, a fullerene, a graphite fluoride, and oxidized graphite. Examples of the graphite include natural graphite and artificial graphite. Examples of the carbon black include acetylene black, Ketjen black (registered trade name), channel black, furnace black, lamp black, and thermal black. Examples of the metal include copper, nickel, aluminum, silver, and gold. Examples of the inorganic compound include tungsten carbide, titanium carbide, tantalum carbide, molybdenum carbide, titanium boride, titanium nitride, titanium oxide, zinc oxide, and titanate potassium. Examples of the electrically conductive high molecular weight material include a polyaniline, a polypyrrole, and a polythiophene.

Examples of the binding agent include a poly(vinylidene fluoride), a polytetrafluoroethylene, a polyethylene, a polypropylene, an aramid resin, a polyamide, a polyimide, a poly(amide imide), a polyacrylonitrile, a polyacrylic acid, a poly(methyl acrylate), a poly(ethyl acrylate), a poly(hexyl acrylate), a polymethacrylic acid, a poly(methyl methacrylate), a poly(ethyl methacrylate), a poly(hexyl methacrylate), a poly(vinyl acetate), a poly(vinyl pyrrolidone), a polyether, a poly(ether sulfone), a hexafluoropolypropylene, a styrene-butadiene rubber, and a carboxymethyl cellulose. Alternatively, for example, the binding agent may be a copolymer formed from at least two types selected from the group consisting of tetrafluoroethylene, hexafluoroethylene, hexafluoropropylene, a perfluoroalkyl vinyl ether, vinylidene fluoride, chlorotrifluoroethylene, ethylene, propylene, pentafluoropropylene, fluoromethyl vinyl ether, acrylic acid, and hexadiene.

Examples of the ion conductor include a Pb—K composite fluoride, a La—Ba composite fluoride, a Ce—Sr composite fluoride, a Cs—Ca composite fluoride, a Ce—Sr—Li composite fluoride, a Pb—Sn composite fluoride, and a Pb—Sn—Zr composite fluoride.

Examples of a solvent dispersing the positive electrode active material, the electrically conductive agent, and the binding agent include N-methyl pyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. For example, a thickening agent may be added to a dispersant. Examples of the thickening agent include a carboxymethyl cellulose and a methylcellulose.

The positive electrode active material layer 13 may be formed, for example, as described below.

First, the positive electrode active material, the electrically conductive agent, and the binding agent are mixed together. For example, after the positive electrode active material and the electrically conductive agent are dry-mixed with each other for a long time (such as 10 to 24 hours) using a mixing device, such as a ball mill, to form a mixture, the binding agent is added thereto, and mixing is further performed. Accordingly, a positive electrode mixture is obtained. Subsequently, the positive electrode mixture is rolled by a rolling machine to have a plate shape, so that the positive electrode active material layer 13 is formed. Alternatively, a solvent is added to the mixture described above to form a positive electrode mixture paste, and this paste may be applied to a surface of the positive electrode collector 12. When the positive electrode mixture paste is dried, the positive electrode active material layer 13 is obtained. In addition, in order to increase the electrode density, the positive electrode active material layer 13 may be compressed.

Although the film thickness of the positive electrode active material layer 13 is not particularly limited, the film thickness thereof may be 1 to 500 μm or may also be further 50 to 200 μm.

A material of the positive electrode collector 12 is, for example, a metal or an alloy. In more particular, the material of the positive electrode collector 12 may be at least one metal selected from the group consisting of copper, chromium, nickel, titanium, platinum, gold, aluminum, tungsten, iron, molybdenum, and zirconium or an alloy thereof. The material of the positive electrode collector 12 may also be, for example, stainless steel.

The positive electrode collector 12 may have either a plate shape or a foil shape and may also be formed from a porous material, a mesh material, or a non-porous material. The positive electrode collector 12 may also be a laminated film. The positive electrode collector 12 may have a layer formed of a carbon material, such as carbon, so as to be in contact with the positive electrode active material layer 13.

When the case 11 also functions as a positive electrode collector, the positive electrode collector 12 may be omitted.

[2-3. Negative Electrode]

The negative electrode 22 includes, for example, a negative electrode active material layer 17 containing a negative electrode active material and a negative electrode collector 16.

As long as the electrode potential of the negative electrode active material is lower than the electrode potential of the positive electrode active material, the negative electrode active material may be the active material described in the above [1-1. Composition of Active Material]. In addition, the amount of fluorine in the active material can be changed in association with charge/discharge. Hence, in a certain discharged state of the fluoride ion secondary battery 10, the active material may have the composition described in the above [1-1. Composition of Active Material].

The "certain discharged state" may be a fully discharged state, for example. Here, the "fully discharged state" indicates the state in which the voltage of the fluoride ion secondary battery reaches a discharge end voltage, and the battery is fully discharged. In the fully discharged state, fluoride ions in an amount corresponding to the reversible capacity are all incorporated in the negative electrode active material.

The negative electrode active material may be not the active material mentioned above and may be, for example, a metal, an alloy, or a fluoride, each of which contains at least one selected from the group consisting of La, Ca, Al, Eu, C, Si, Ge, Sn, In, V, Cd, Cr, Fe, Zn, Ga, Ti, Nb, Mn, Yb, Zr, Sm, La, Ce, Rb, Cs, Mg, K, Na, Ba, and Sr.

The negative electrode active material layer 17 may include either only one active material or at least two types of active materials.

The negative electrode active material layer 17 may further include, if needed, an electrically conductive agent, a binding agent, and/or an ion conductor. As the electrically conductive agent, the binding agent, the ion conductor, a solvent, and a thickening agent, for example, those described in the above [2-2. Positive Electrode] may be appropriately used.

Although the film thickness of the negative electrode active material layer 17 is not particularly limited, the film thickness thereof may be 1 to 500 μm and may be further 50 to 200 μm.

As a material of the negative electrode collector 16, for example, a material similar to the material of the positive electrode collector 12 described in the above [2-2. Positive Electrode] may be appropriately used. The negative electrode collector 16 may have a plate shape or a foil shape.

When the case 11 also functions as a negative electrode collector, the negative electrode collector 16 may be omitted.

[2-4. Separator]

Examples of the separator 14 include a porous film, a woven cloth, and a non-woven cloth. Examples of the non-woven cloth include a resin non-woven cloth, a glass non-woven cloth, and a paper-made non-woven cloth. As a material of the separator 14, a polyolefin, such as a polypropylene or a polyethylene, may be used. The thickness of the separator 14 is, for example, 10 to 300 μm. The separator 14 may be either a monolayer film formed from one material or a composite film (or a multilayer film) formed from at least two types of materials. The porosity of the separator 14 is, for example, in a range of 30% to 70%.

[2-5. Electrolyte]

The electrolyte may be a material having a fluoride ion conductivity.

The electrolyte is, for example, an electrolyte liquid. The electrolyte liquid includes a solvent and a fluoride salt dissolved in the solvent. The solvent may be water or a non-aqueous solvent.

Examples of the non-aqueous solvent include an alcohol, a cyclic ether, a chain ether, a cyclic carbonate ester, a chain carbonate ester, a cyclic carboxylic acid ester, and a chain carboxylic acid ester.

Examples of the alcohol include ethanol, ethylene glycol, and propylene glycol.

Examples of the cyclic ether include 4-methyl-1,3-dioxolane, 2-methyltetrahydrofuran, and a crown ether. Examples of the chain ether include 1,2-dimethoxyethane, ethylene glycol dimethyl ether, diethylene glycol dimethyl ether, triethylene glycol dimethyl ether, and tetraethylene glycol dimethyl ether. Examples of the cyclic carbonate ester include ethylene carbonate, propylene carbonate, butylene carbonate, fluoroethylene carbonate, and 4,5-difluoroethylene carbonate. Examples of the chain carbonate ester include dimethyl carbonate, ethyl methyl carbonate, and diethyl carbonate. Example of the cyclic carboxylic acid ester include γ-butyrolactone. Examples of the chain carboxylic acid ester include ethyl acetate, propyl acetate, and butyl acetate.

For example, the non-aqueous solvent may also be an ionic liquid.

Examples of a cation of the ionic liquid include 1-ethyl-3-methylimidazolium cation, 1-ethylpyridinium cation, 1-methoxyethyl-1-methylpyrrolidinium cation, N-methyl-N-propylpiperidinium cation, trimethylbutylammonium cation, N,N-diethyl-N-methylmethoxyethylammonium cation, tetrabutylphosphonium cation, triethyl-(2-methoxyethyl) phosphonium cation, triethylsulfonium cation, and diethyl-(2-methoxyethyl)sulfonium cation.

Examples of an anion of the ionic liquid include bis(fluorosulfonyl)amide anion, bis(trifluoromethanesulfonyl)amide anion, hexafluorophosphate anion, tris(pentafluoroethyl)trifluorophosphate anion, trifluoromethanesulfonate anion, and tetrafluoroborate anion.

The electrolyte may contain either only one solvent or at least two types of solvents.

Examples of the fluoride salt include an inorganic fluoride salt, an organic fluoride salt, and an ionic liquid.

Examples of the inorganic fluoride salt include lithium fluoride, sodium fluoride, potassium fluoride, rubidium fluoride, cesium fluoride, and ammonium fluoride.

Examples of the organic fluoride salt include tetramethylammonium fluoride, neopentyltrimethylammonium fluoride, trineopentylmethylammonium fluoride, tetraneopentylammonium fluoride, 1,3,3,6,6-hexamethylpiperidinium fluoride, 1-methyl-1-propylpiperidinium fluoride, tetramethylphosphonium fluoride, tetraphenylphosphonium fluoride, and trimethylsulfonium fluoride.

The electrolyte may contain either only one fluoride salt or at least two types of fluoride salts.

The solvent and the fluoride salt are, for example, sealed in a sealing container and are mixed together by stirring. Accordingly, the fluoride salt is dissolved in the solvent. In addition, the fluoride salt may be not totally dissolved in the solvent and may partially remain without being dissolved.

The molar ratio of the fluoride salt to the solvent in the electrolyte liquid is not particularly limited and may be, for example, 1/150 to 1/2 or may be further 1/100 to 1/5. Accordingly, while the increase in viscosity of the electrolyte liquid is suppressed, the concentration of the fluoride ions in the electrolyte liquid can be increased.

[2-6. Modified Example]

Figure 2:
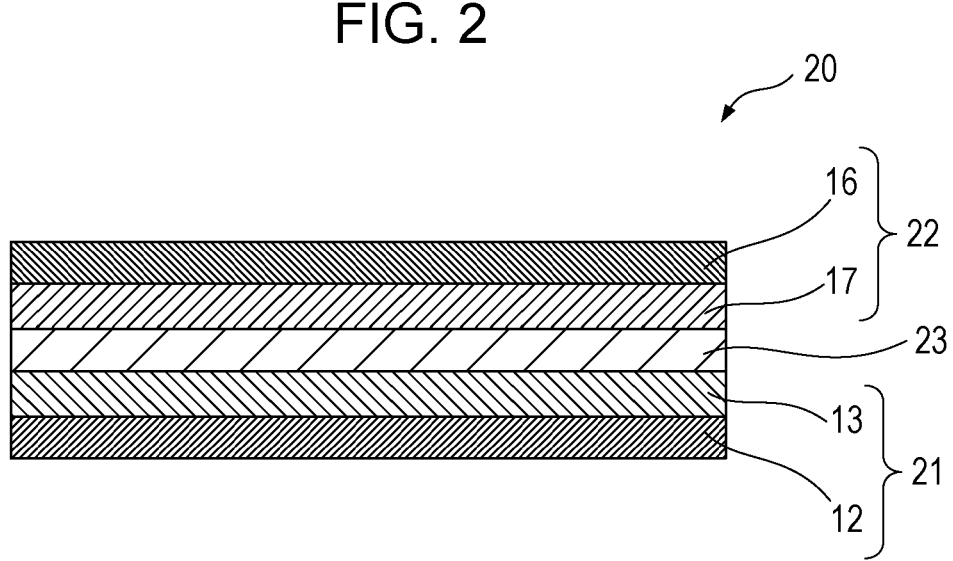
FIG. 2 is a cross-sectional view schematically showing a modified example of the fluoride ion secondary battery according to the embodiment.

FIG. 2 is a cross-sectional view schematically showing an example of a fluoride ion secondary battery 20.

The fluoride ion secondary battery 20 includes a positive electrode 21, a negative electrode 22, and a solid electrolyte 23. The positive electrode 21, the solid electrolyte 23, and the negative electrode 22 are laminated in this order to form a laminate.

The positive electrode 21 is, for example, similar to that described in the above [2-2. Positive Electrode]. The negative electrode 22 is, for example, similar to that described in the above [2-3. Negative Electrode].

As the solid electrolyte 23, the ion conductor described in the above [2-2. Positive Electrode] may be used.

Although the film thickness of the solid electrolyte 23 is not particularly limited, the film thickness thereof may be 1 to 100 μm.

[3. Experimental Results]

[3-1. Formation of Sample]

In accordance with the following procedure, various samples were formed. The following operations were all performed in an argon atmosphere in a glove box.

First, as raw materials, anhydrous barium fluoride ($BaF_2$), anhydrous copper fluoride (II) ($CuF_2$), and anhydrous iron fluoride (III) ($FeF_3$) were prepared. Those raw materials were weighed so that the molar ratio was set to $BaF_2$:$CuF_2$:$FeF_3$=1:1:1, and the total mass was 2 g. The raw materials thus weighed were charged in an agate mortar and were then dry-mixed together for 15 minutes. A mixture thus obtained was powder-compacted using a mold having a diameter of 15 mm, so that a pellet was obtained. After this pellet was placed in a combustion boat in which Pt foil was laid, and this boat was then charged in a small electric furnace in a glove box, the temperature in the furnace was increased from room temperature to 600° C. at a rate of 300° C./hour and was then maintained at 600° C. for 5 hours. Accordingly, the mixture was fired, so that Sample 1 of an active material was obtained.

Except for that the molar ratio was set to $BaF_2$:$CuF_2$:$FeF_3$=0.95:1:1, by a method similar to that of Sample 1, Sample 2 of the active material was obtained.

Except for that the molar ratio was set to $BaF_2$:$CuF_2$:$FeF_3$=0.9:1:1, by a method similar to that of Sample 1, Sample 3 of the active material was obtained.

Except for that the molar ratio was set to $BaF_2$:$CuF_2$:$FeF_3$=0.8:1:1, by a method similar to that of Sample 1, Sample 4 of the active material was obtained.

Except for that the molar ratio was set to $BaF_2$:$CuF_2$:$FeF_3$=0.7:1:1, by a method similar to that of Sample 1, Sample 5 of the active material was obtained.

Except for that $FeF_2$ was used instead of using $CuF_2$, and the molar ratio was set to $BaF_2$:$FeF_2$:$FeF_3$=1:1:1, by a method similar to that of Sample 1, Sample 6 of the active material was obtained.

$CuF_2$ in a mass of 2 g was weighed, so that Sample 7 of the active material was obtained.

$FeF_3$ in a mass of 2 g was weighed, so that Sample 8 of the active material was obtained.

[3-2. Analysis of Sample (In Synthesis)]

The phase composition of Sample 1 was analyzed by an XRD method. As a result, a crystalline structure which belonged to the Space group C12/c1 was confirmed.

The composition of this crystalline structure was analyzed by an ICP emission spectrochemical analytical method and an ion chromatography. In particular, the metals were analyzed by an ICP emission spectrochemical analytical method, and fluorine was analyzed by an ion chromatography. The composition of Sample 1 was $BaCuFeF_{6.6}$. Although the amount of fluorine was slightly decreased as compared to that of a target composition, $BaCuFeF_7$, which was expected from the raw materials of Sample 1, the reason for this is believed that fluorine was partially evaporated during the firing. In addition, the evaporation of fluorine may be suppressed when a sealing type ampoule is used instead of the combustion boat, and/or when the firing conditions are adjusted.

By an XRD analysis, the crystalline structure of Sample 6 was analyzed. As a result, since the crystalline structure of Sample 6 was divided into many phases, a phase having a target crystalline structure could not be confirmed. In other words, the target composition $BaFe_2F_7$ and a solid solution similar thereto could not be obtained.

[3-3. Formation of Battery]

By the use of Samples 1 to 5, 7 and 8 of the positive electrode active materials, battery cells for evaluation were formed. All operations for the formation of the battery were performed in an argon atmosphere in a glove box in which the dew point was set to −60° C. or less and the oxygen value was set to 5 ppm or less.

First, Sample 1 of the positive electrode active material and acetylene black were weighed to have a mass ratio of 7:2.

Sample 1 and the acetylene black thus weighed were charged in a zirconia-made container having a volume of 45 cc together with zirconia-made balls each having a diameter of 3 mm and were then sealed. This container was set in a planetary type ball mill, so that Sample 1 and the acetylene black were dry-mixed together at 150 rpm for 12 hours.

After a mixed powder thus formed was recovered from the container, a polytetrafluoroethylene (PTFE) was added to this mixed powder and was then mixed therewith by an agate mortar. The mass ratio of the mixed powder to the PTFE was set to 9:1. Accordingly, a positive electrode mixture was obtained. This positive electrode mixture was rolled by a roller pressing machine into a sheet having a thickness of 100 μm and was then punched out into a square shape having a size of 5 mm by 5 mm. Accordingly, a positive electrode mixture plate was obtained.

The positive electrode mixture plate was placed in a Pt mesh having a size of 8 mm by 30 mm and was then set in a pressing machine. A pressure of 20 MPa was applied to the positive electrode mixture plate and the Pt mesh for 10 seconds, so that pressure bonding therebetween was performed. Accordingly, a positive electrode containing Sample 1 was obtained.

As a counter electrode, a Pb plate having a size of 8 mm by 30 mm was prepared.

As a reference electrode, an $Ag/Ag^+$ reference electrode was prepared. The $Ag/Ag^+$ reference electrode was formed of a glass tube equipped with a filter and an Ag wire inserted into the glass tube, and the inside of the glass tube was filled with an inner solution. As the inner solution, a solution in which silver nitrate and tetrabutylammonium perchlorate were each dissolved in acetonitrile to have a concentration of 0.1 M was used.

The positive electrode functioning as a working electrode, the counter electrode, and the reference electrode were set in a glass cell, and this glass cell was filled with an electrolyte liquid. As the electrolyte liquid, a mixture was used in which 1-methyl-1-propylpiperidinium fluoride (MPPF) (manufactured by Nard Institute, Ltd.), N,N,N-trimethyl-N-propylammonium-bis(trifluoromethanesulfonyl)amide (TMPA-TFSA) (manufactured by Kanto Chemical Co., Inc.) were mixed together to have a molar ratio, MPPF:TMPA-TFSA, of 1:50.

Accordingly, a battery cell using Sample 1 was obtained.

By a method similar to that described above, battery cells using Samples 2 to 5, 7, and 8 were also respectively formed.

[3-4. Discharge Test]

A discharge test was performed on each of the battery cells. This test was performed in a constant-temperature bath at 25° C. In particular, at a rate of 0.01 C calculated from the theoretical capacity of the positive electrode active material, the discharge was performed until the potential difference between the working electrode and the reference electrode reached −1.8 V, so that the initial discharge capacity of each battery cell was evaluated.

In Table 1, the composition (target composition) of the positive electrode active material of each Sample, the initial discharge capacity, and the number of reaction electrons are shown.

TABLE 1

|  | Composition of Positive Electrode Active Material | Initial Discharge Capacity [mAh/g] | Number of Reaction Electrons |
| --- | --- | --- | --- |
| Sample 1 | $BaCuFeF_{7.00}$ | 150 | 1.50 |
| Sample 2 | $Ba_{0.95}CuFeF_{6.90}$ | 159 | 1.55 |
| Sample 3 | $Ba_{0.90}CuFeF_{6.80}$ | 163 | 1.61 |
| Sample 4 | $Ba_{0.80}CuFeF_{6.60}$ | 135 | 1.30 |
| Sample 5 | $Ba_{0.75}CuFeF_{6.50}$ | 122 | 1.16 |
| Sample 7 | $CuF_2$ | 80 | 0.30 |
| Sample 8 | $FeF_3$ | 15 | 0.06 |

As shown in Table 1, the battery cells of Samples 1 to 5 each showed a large initial discharge capacity as compared to that of each of the battery cells of Samples 7 and 8. In addition, the number of reaction electrons of each of the positive electrode active materials of Samples 1 to 5 was more than 1. On the other hand, in the positive electrode active material of Sample 7, the defluorination reaction did not sufficiently occur, and in the positive electrode active material of Sample 8, the defluorination reaction also did not sufficiently occur.

[3-5. Analysis of Sample (after Discharge)]

The composition of Sample 1 after the discharge was analyzed by a method similar to that of the above [3-2. Analysis of Sample (In Synthesis)]. The composition of Sample 1 after the discharge was $BaCuFeF_{4.95}$. The discharge capacity calculated from the change in amount of fluorine caused by the discharge was 165 mAh/g and approximately coincided with the measurement result shown in Table 1.

[3-6. Supplement]

As described in the above [1-2. Assumed Mechanism], the reason the discharge capacity is increased is believed that the metal composite fluoride containing at least one metal selected from the group consisting of an alkali metal, an alkaline earth metal, scandium, yttrium, and a lanthanoid and at least two types of transition metals is able to release fluoride ions. Hence, it is inferred that this advantage is not limited to the composition of each of Samples 1 to 5 shown by the experiment and can also be obtained, for example, by the other compositions described in [1-1. Composition of Active Material]. In particular, it is expected that when the above at least one metal is an alkaline earth metal, the structure similar to that of each of Samples 1 to 5 shown by the experiments can be obtained.

What is claimed is:

1. A fluoride ion secondary battery comprising:
a positive electrode including an active material which contains a metal composite fluoride;
a negative electrode; and
an electrolyte having a fluoride ion conductivity,
wherein the metal composite fluoride is represented by a formula $A_xM1_{y1}M2_{y2}F_z$, where A is Mg, Ca, Sr, or Ba; M1 and M2 are two different types each selected from the group consisting of Mn, Fe, Co, Ni, and Cu; and $0.7 \leq x \leq 1$, $1 < y1+y2 \leq 2$, and $6 < z < 8$.

2. The fluoride ion secondary battery according to claim 1,
wherein in the metal composite fluoride, an oxidation number of the first transition metal M1 is +2, and an oxidation number of M2 is +3.

3. The fluoride ion secondary battery according to claim 1,
wherein M1 is Cu, and
M2 is Fe.

4. The fluoride ion secondary battery according to claim 1,
wherein the at least one metal is Ba.

5. The fluoride ion secondary battery according to claim 1,
wherein the metal composite fluoride has a crystalline structure which belongs to the space group C12/c1.

* * * * *